United States Patent
Yamaguchi

(10) Patent No.: US 8,296,006 B2
(45) Date of Patent: Oct. 23, 2012

(54) TIRE PRESSURE MONITORING DEVICE

(75) Inventor: Hideaki Yamaguchi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 1182 days.

(21) Appl. No.: 12/095,260

(22) PCT Filed: Nov. 28, 2006

(86) PCT No.: PCT/JP2006/323691
§ 371 (c)(1),
(2), (4) Date: May 28, 2008

(87) PCT Pub. No.: WO2007/063837
PCT Pub. Date: Jun. 7, 2007

(65) Prior Publication Data
US 2009/0171525 A1   Jul. 2, 2009

(30) Foreign Application Priority Data

Nov. 29, 2005   (JP) ................ 2005-342978

(51) Int. Cl.
*G01M 17/00* (2006.01)
*G06F 7/00* (2006.01)
*G06F 11/30* (2006.01)
*G06F 19/00* (2006.01)
*G07C 5/00* (2006.01)

(52) U.S. Cl. .......... 701/29.1; 340/426.33; 340/442; 340/444; 340/447; 340/870.03

(58) Field of Classification Search ........ 701/29, 701/29.1; 340/442, 444, 447, 870.03, 426.33, 340/904
See application file for complete search history.

(56) References Cited

U.S. PATENT DOCUMENTS

| | | | |
|---|---|---|---|
| 3,806,869 A * | 4/1974 | Davis, Jr. ............... | 340/447 |
| 5,602,524 A * | 2/1997 | Mock et al. ............ | 340/447 |
| 6,218,936 B1 | 4/2001 | Imao | |
| 6,838,985 B2 * | 1/2005 | Ghabra et al. ......... | 340/445 |
| 6,963,274 B2 | 11/2005 | Saheki et al. | |
| 6,983,649 B2 | 1/2006 | Katon | |
| 6,998,973 B2 | 2/2006 | Lefaure | |
| 7,336,644 B2 | 2/2008 | Berndt et al. | |
| 7,467,034 B2 * | 12/2008 | Breed et al. ........... | 701/29 |
| 2002/0073771 A1 * | 6/2002 | Katou ..................... | 73/146 |
| 2003/0071742 A1 * | 4/2003 | Tang et al. .......... | 340/870.16 |
| 2003/0122660 A1 * | 7/2003 | Kachouh et al. ...... | 340/442 |
| 2003/0145650 A1 * | 8/2003 | Juzswik et al. ........ | 73/146 |

(Continued)

FOREIGN PATENT DOCUMENTS

DE   103 05 373 A1   8/2004

(Continued)

*Primary Examiner* — Khoi Tran
*Assistant Examiner* — Jamie Figueroa
(74) *Attorney, Agent, or Firm* — Foley & Lardner LLP

(57) ABSTRACT

In a tire pressure monitoring device, a receiving apparatus 1 detects a received signal level from sensor units 2 to judge, based on the signal level, tires, a front wheel or a rear wheel, provided with the sensor units 2. It estimates collision of data signals from the sensor units 2a, 2b of the front wheel and from the sensor units 2c 2d of the rear wheels. When it estimates that the data signals from the sensor units 2a, 2b of the front wheel and from the sensor units 2c 2d of the rear wheels collide with each other, it executes a process for acting an antenna shifting part 13 so as to produce a difference between the reception intensity levels.

8 Claims, 10 Drawing Sheets

U.S. PATENT DOCUMENTS

| | | | |
|---|---|---|---|
| 2003/0179085 A1 * | 9/2003 | Ghabra et al. | 340/445 |
| 2004/0172179 A1 | 9/2004 | Miwa | |
| 2006/0146782 A1 | 7/2006 | Berndt et al. | |
| 2006/0220805 A1 * | 10/2006 | Thomas et al. | 340/426.33 |
| 2006/0220815 A1 * | 10/2006 | Thomas | 340/447 |
| 2006/0222120 A1 * | 10/2006 | Yegin et al. | 375/347 |

FOREIGN PATENT DOCUMENTS

| | | |
|---|---|---|
| EP | 1 215 056 A2 | 6/2002 |
| EP | 1 826 029 A1 | 8/2007 |
| JP | 5-013802 U | 2/1993 |
| JP | 2000-062420 A | 2/2000 |
| JP | 2003-237328 A | 8/2003 |
| JP | 2004-149093 A | 5/2004 |
| JP | 2004-242323 A | 8/2004 |
| JP | 2004-262324 A | 9/2004 |
| JP | 2005-112056 A | 4/2005 |
| JP | 2005-309958 A | 11/2005 |
| JP | 2006-111158 A | 4/2006 |
| WO | WO 2006/064866 A1 | 6/2006 |

* cited by examiner

| IDENTIFICATION INFORMATION (ID) | TIRE PRESSURE INFORMATION | TIRE ROTATIONAL DIRECTION INFORMATION |

TIRE PRESSURE MONITORING DEVICE

TECHNICAL FIELD

The present invention belongs to a technical field in which a tire pressure monitoring device that receives tire pressure signals wirelessly transmitted from sensor units provided on tires of a motor vehicle and judges positions of the tires with the sensor units based on received signal levels, to monitor tire pressures in relation of respective positions of the tires.

BACKGROUND OF THE INVENTION

In a conventional tire pressure monitoring device, it receives without wire information on rotational directions of tires outputted from detecting units provided on all the tires, and detects an installation position of each tire based on the rotational direction of the tire, obtained from the rotational direction information, and receiver sensitivity of received wireless signals. Such a device is disclosed in Japanese Patents Laid-open No. 2005-112056, pages 2-6 and all of its drawings.

DISCLOSURE OF THE INVENTION

Problem(S) To Be Solved By The Invention

However, in the conventional monitoring device, there happens to be a case where a plurality of transmitting apparatuses of the detecting units sends the pressure signals at the same time. The same timings of transmissions cause collisions of data, and consequently the monitoring device cannot receive both or all data, thereby causing a lack in data.

The present invention is made in order to solve the above described problem, and its object is to provide a tire pressure monitoring device which can surely receive data so as to decrease a lack in the data, thereby obtaining a high reliability thereof.

Means For Solving The Problem

In order to achieve the above object, a tire pressure monitoring device of the invention is constructed to include sensor units provided on respective wheels of a motor vehicle, and a receiving apparatus which is provided on a vehicle body of the motor vehicle and receives data signals of tire pressures wirelessly sent at substantially the same output levels from the sensor units. The receiving apparatus includes at least two receiving antennas located apart from each other in a longitudinal direction of the motor vehicle, an antenna shifting means for shifting the receiving antennas, a reception intensity level detecting means for detecting reception intensity levels of the received data signals outputted from the sensor units, a front-wheel/rear wheel judging means for judging, based on the reception intensity level, whether the wheel, provided with the senor unit from which the data signal is received, is a front wheel or a rear wheel, a signal collision estimating means for estimating whether the data signal from the sensor unit of the front wheel and the data signal from the sensor unit of the rear wheel collide with each other, and a shifting control means for actuating the antenna shifting means so that the reception intensity levels depart from each other when the data signal from the sensor unit of the front wheel and the data signal from the sensor unit of the rear wheel collide with each other.

Effect of the Invention

Therefore, the tire pressure monitoring device of the invention can more surely receive the data to decrease the lack in the data, thereby increasing its reliability.

DESCRIPTION OF REFFERENCE NUMBER

Figure 1:
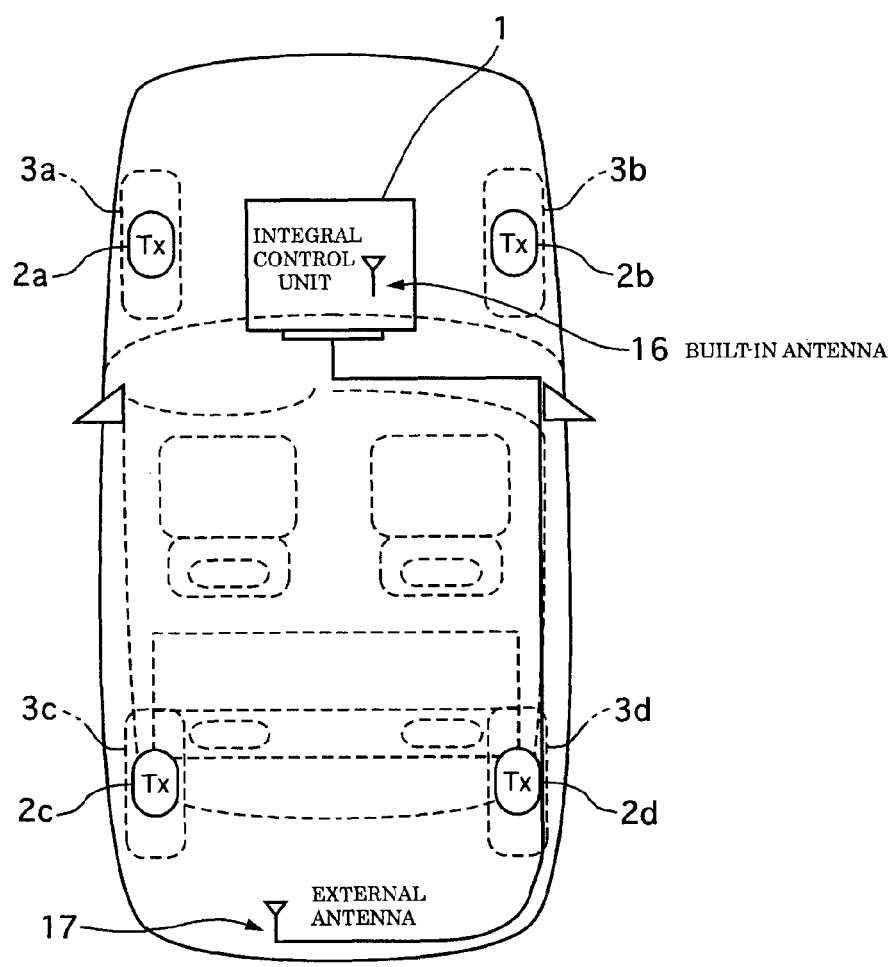
FIG. 1 is a schematic view showing a construction of a motor vehicle which is provided with a tire pressure monitoring device of a first embodiment according to the present invention.

1 receiving apparatus
11 CPU part
12 tuner
13 antenna shifting part
14 regulator
15 I/O interface
16 built-in antenna (receiving antenna)
17 external antenna (receiving antenna)
2 (2a to 2d) sensor unit
21 CPU part
22 tire pressure sensor
23 rotation sensor
24 battery
25 RF part
26 antenna
3 (3a to 3d) tire

BEST MODE FOR CARRYING OUT THE INVENTION

Hereinafter, the embodiment of the invention for realizing a tire pressure monitoring device will be described with reference to the accompanying drawings.

FIRST EMBODIMENT

Firstly, a construction of the tire pressure monitoring device of a first embodiment will be described.

FIG. 1 is a view showing a construction of a tire pressure monitoring system of the first embodiment.

The tire pressure monitoring system TPMS mainly includes a receiving apparatus 1 provided on a vehicle body of a motor vehicle, and sensor units 2 (2a to 2d) provided on four tires 3a to 3d, respectively.

Figure 2:
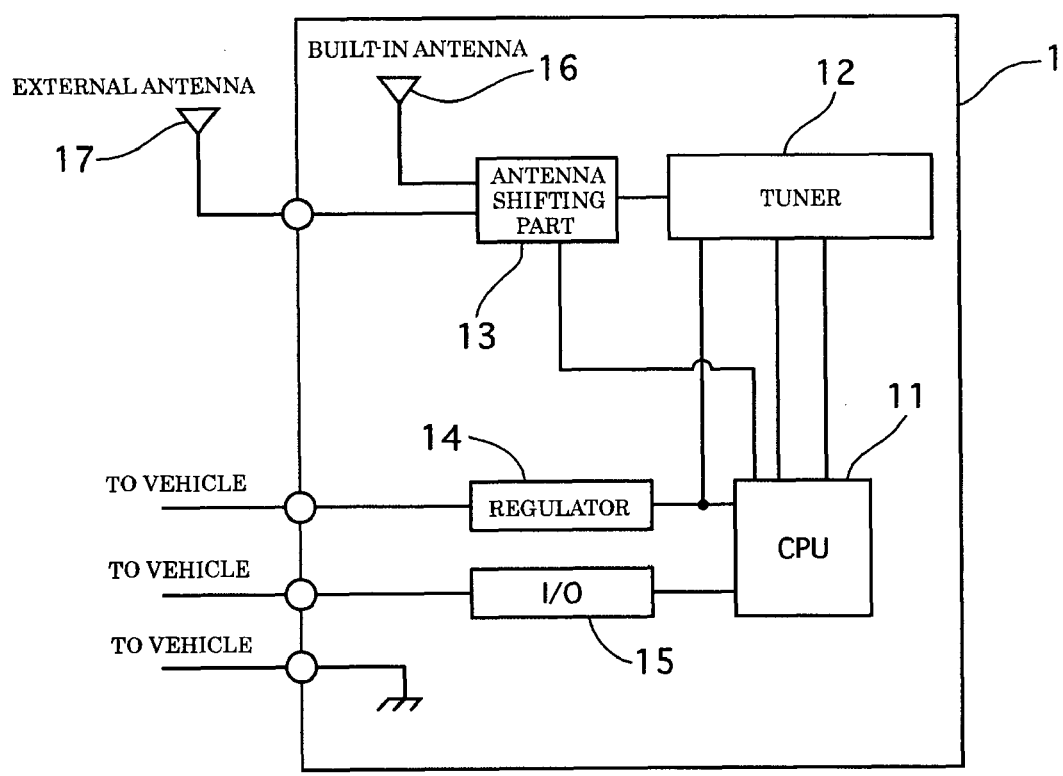
FIG. 2 is a control block diagram showing a receiving apparatus which used for the tire pressure monitoring device, mounted on a vehicle body, of the first embodiment.

FIG. 2 is a control block diagram showing the receiving apparatus 1 in the tire pressure monitoring device of the first embodiment.

The receiving apparatus 1 mainly consists of a Central Processing Unit (CPU) part 11, a tuner 12, an antenna shifting part 13, a regulator 14, an Input/Output (I/O) interface 15, a built-in antenna and an external antenna 17.

The CPU part 11 executes antenna shifting control, communication of data between the receiving apparatus 1 and on-vehicle device (or vehicle communication network), identification of identification numbers outputted from the sensor units 2, judgment in determining a left wheel or a right wheel based on information on rotational directions of the wheels, a judgment in determining a front wheel or a rear wheel based on receiving sensitivities and others, and it sends information on states of the wheels.

The tuner 12 converts a received radio signal to output to the CPU part 11.

The antenna shifting part 13 shifts between the built-in antenna 16 and the external antenna 17. The antenna shifting part 13 corresponds to an antenna shifting means of the present invention.

The regulator 14 supplies its electric power to the CPU part 11 and the tuner 12.

The I/O interface 16 is built in the receiving apparatus 1, and it is arranged at a front side in the interior of a passenger room.

The external antenna 17 is provided at a rear side at the exterior of the passenger room, and it also functions as a receiving antenna of a keyless entry system. It is preferable that the external antenna 17 is arranged at an outer side of a vehicle external body, for example in a bumper.

Figures 3, 4:
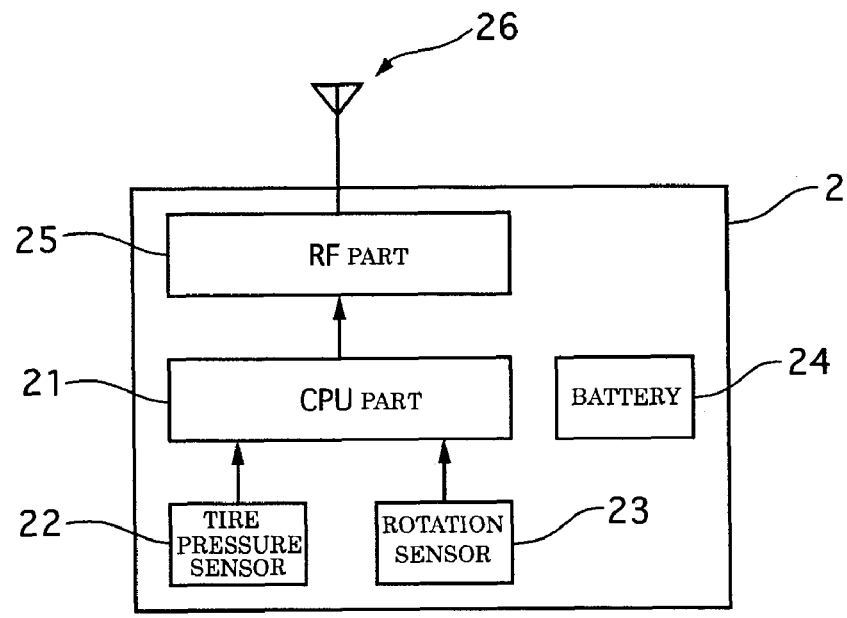
FIG. 3 is a control block diagram showing a sensor unit provided on a wheel side of the first embodiment.
FIG. 4 is a diagram explaining information included in transmission data outputted from the sensor unit of the first embodiment.

FIG. 3 is a control block diagram of the sensor units in the first embodiment.

Each sensor unit 2 mainly consists of a CPU part 21, a tire pressure sensor 22, a rotation sensor 23, a battery 24, a Radio Frequency (RF) part 25 and an antenna 26.

The CPU part 21 stores respective information on identification numbers therein, then producing data shown in FIG. 4 to execute a process and its control for sending the data to the receiving apparatus 1.

The tire pressure sensor 22 detects a pressure of a tire provided therewith.

The rotation sensor 23 detects a rotational direction of the tire provided therewith. As the rotation sensor 23, an acceleration sensor is employed for example.

The battery 24 supplies its electric power to necessary parts of the sensor units 2.

The RF part 25 converts the data shown in FIG. 4 outputted from the CPU part 21 into a radio signal, and then it outputs it as an RF wave from the antenna 26.

Next, the operation of the tire pressure monitoring device of the first embodiment will be described.

<About Collisions of the Data>

In the tire pressure monitoring system TPMS, the sensor units 2 of the tire position detecting device detect stops/rotations of the tires by using the rotation sensors 23, respectively. Further, the sensor units 2 change data transmission periods based on the stops/rotations of the tires.

A tire stop period is set to be relatively long, for example one hour, while a tire rotation period is set to be relatively shot, for example ten seconds or one minute.

Starts of the transmission of the data are judged by the sensor units 2, respectively, which may cause the transmission timings to become the same between the sensor units 2 in some cases.

In that case, the sensor units 2 are constructed so that at least two frames can be avoided from the collision of data, by sending the same data by some frames in one transmission, and also by setting intermission time between transmissions of the frames to be varied. The data is fixed when the received two frames are completely consistent with each other, while inconsistent data is judged to be erroneous data.

However, two frames are not always received according to a surrounding environment and others. The motor vehicle is provided with the four sensor units 2, which independently send the data at their own timings. This sometimes causes the transmission timings of the plurality of sensor units to be the same time, consequently causing the collision of data. In this case, their data cannot be received by the receiving apparatus 1. The tire pressure monitoring device of the present invention solves the problems as described above.

<A Tire Position Detecting Process>

Figure 5:
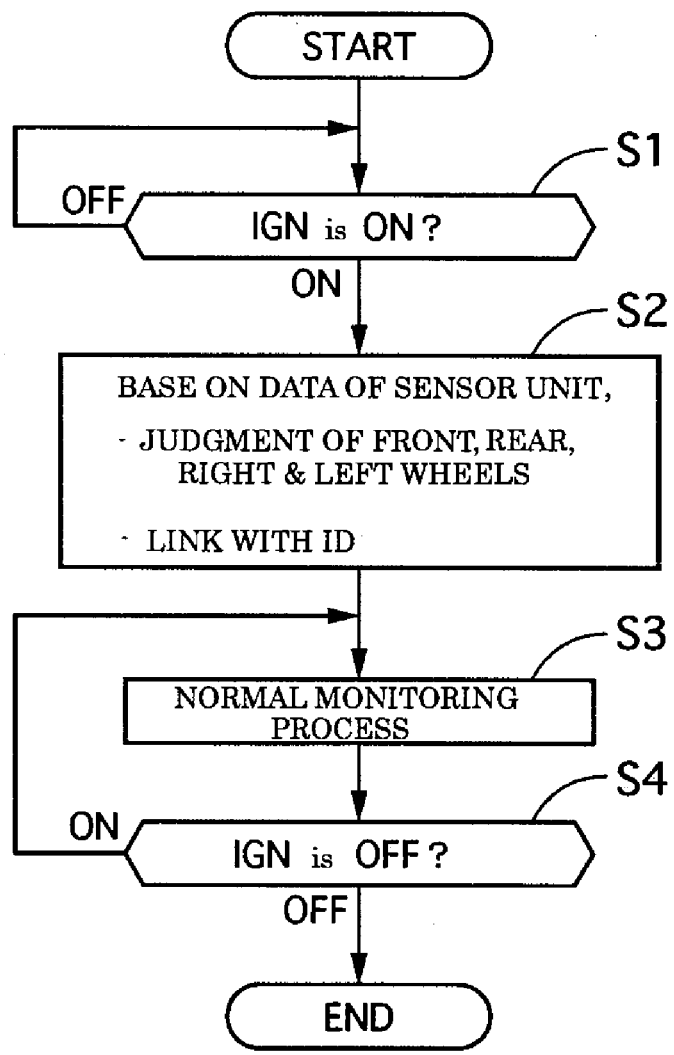
FIG. 5 is a flow chart showing a flow of a tire pressure monitoring process which contains a tire position detecting process executed by the receiving apparatus of the first embodiment.

FIG. 5 is a flow chart showing a flow of a tire pressure monitoring process, including a tire position detecting process, executed by the receiving apparatus 1 of the first embodiment, and hereinafter each step thereof will be described.

At a step S1, the CPU part 11 judges whether or not an ignition (IGN) electric power source is ON. If the IGN is ON, the flow goes to a step S2, while if the IGN is OFF, the flow returns to the step S1.

At the step S2, the CPU part 11 receives information from each sensor unit 2, and then it judges based on information on the rotation directions of the tires on which side wheel (the left wheel or the right wheel) the sensor units are provided in relation to each ID (namely identification information). In addition, it also judges, based on the receiving sensitivity of the external antenna 17, on which side wheel (the front wheel or the rear wheel) the sensor units are provided in relation to the identification information. This step S2 corresponds to a front wheel-a rear wheel judging means of the present invention.

Further, the identification information and data on tire pressures are linked with the positions of the tires, to be stored.

At a step S3, the tire pressure monitoring device executes a normal tire pressure monitoring process. In this process, the positions of the tires and the data on the tire pressures are always linked with each other.

At a step S4, the CPU part 11 judges whether or not the IGN electric power source is OFF. If it is OFF, the flow ends, while if it is ON, the flow returns to the step S3.

<Receiving Process Allowing for Collision Of Data>

Figure 6:
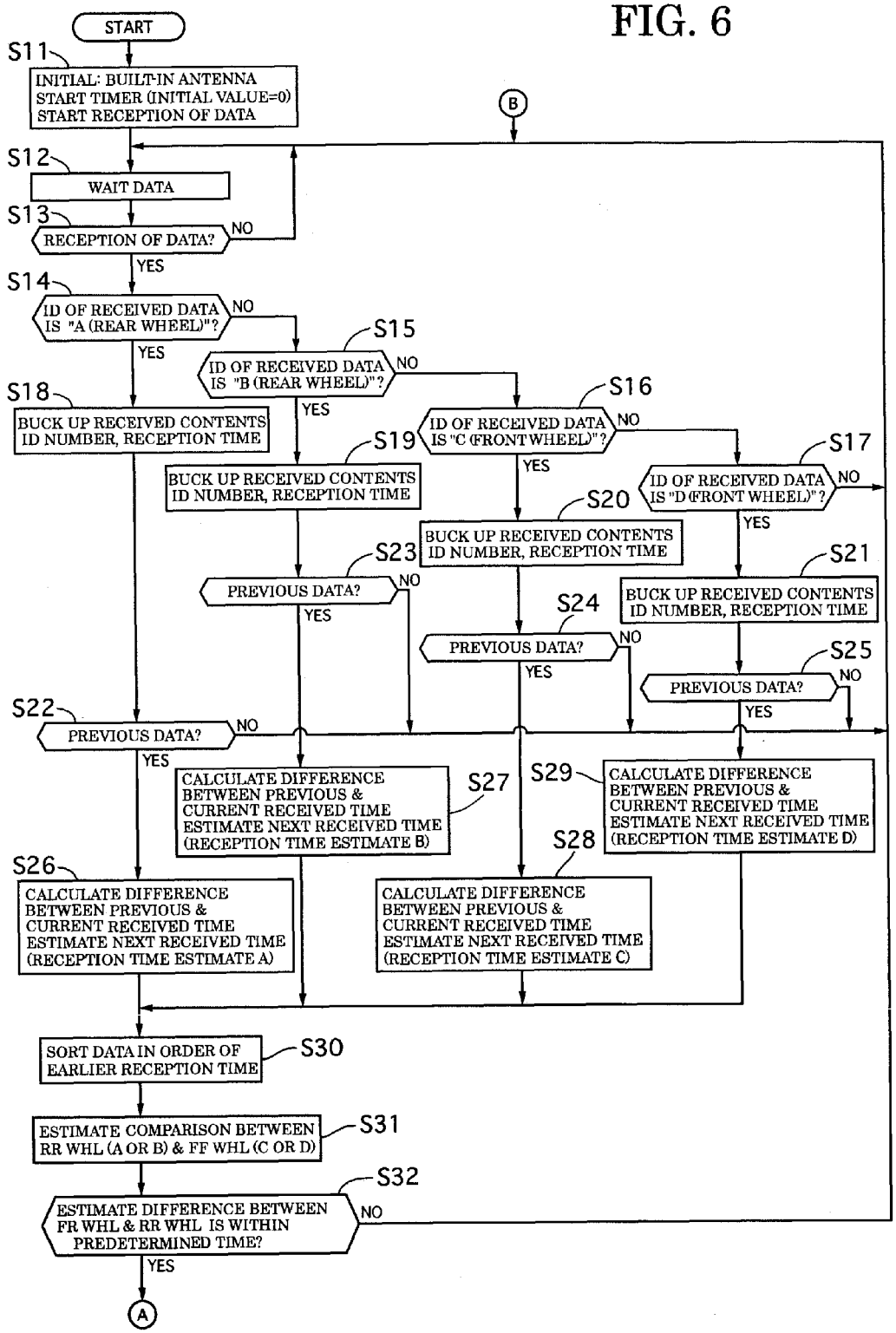
FIG. 6 is a flow chart showing a part of a flow of a receiving process in the tire pressure monitoring process executed by the receiving apparatus of the first embodiment.
Figure 7:
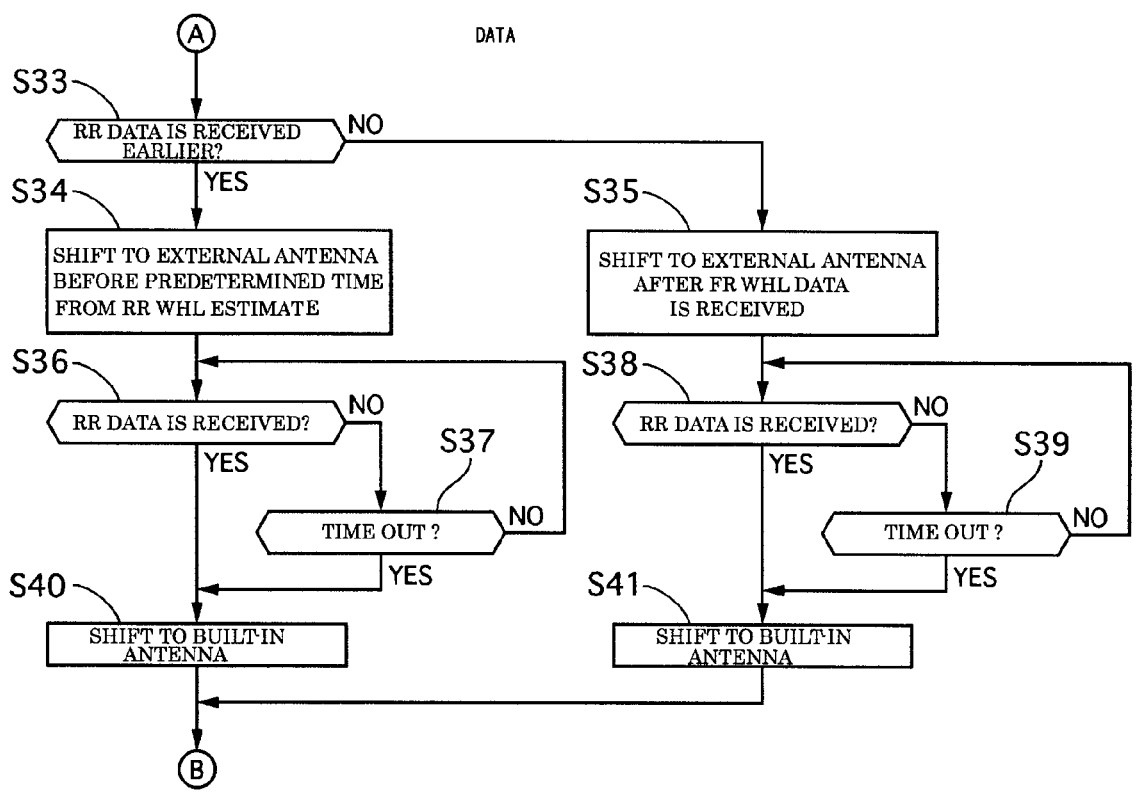
FIG. 7 is a flow chart showing the rest of the flow of the receiving process in the tire pressure monitoring executed by the receiving apparatus of the first embodiment.

FIG. 6 and FIG. 7 is a flow chart showing a flow of a receiving process in the tire pressure monitoring process executed by the receiving apparatus 1 of the first embodiment, and hereinafter each step thereof will be described. Incidentally, in the ID data, A indicates a rear right wheel, B indicates a rear left wheel, C indicates a front right wheel and D indicates a front left wheel.

At a step S11, the receiving apparatus 1 starts a timer in a state where it uses the built-in antenna 16, and also it starts the data reception, and then the flow goes to a step S12.

At the step S12, it waits to receive the data, and then the flow goes to a step S13.

At the step S13, it judges whether or not the data is received. If the data is received, the flow goes to a step S14, while if the data is not received, the flow returns to the step S12.

At the step S14, it judges whether or not the received ID data indicates "A (the rear right wheel)". If it indicates A, the flow goes to a step S18, while if it dos not indicate A, the flow goes to a step S15.

At the step S15, it judges whether or not the received ID data indicates "B (the rear left wheel)". If it indicates B, the flow goes to a step S19, while if it dos not indicate B, the flow goes to a step S16.

At the step S16, it judges whether or not the received ID data indicates "C (the front right wheel)". If it indicates C, the flow goes to a step S20, while if it dos not indicate C, the flow goes to a step S17.

At the step S17, it judges whether or not the received ID data indicates "D (the front left wheel)". If it indicates D, the flow goes to a step S21, while if it does not indicate D, the flow returns to the step S12.

At the step S18, the ID data and receipt time are stored as receipt contents, and then the flow goes to a step S22.

At the step S19, the ID data and receipt time are stored as receipt contents, and then the flow goes to a step S23.

At the step S20, the ID data and receipt time are stored as receipt contents, and then the flow goes to a step S24.

At the step S21, the ID data and receipt time are stored as receipt contents, and then the flow goes to a step S25.

At the step S22, it judges whether or not the data was received at previous time. If the data was received, the flow goes to a step S26, while if it the data is not received, the flow returns to the step S12.

At the step S23, it judges whether or not the data was received at previous time. If the data was received, the flow goes to a step S27, while if it the data is not received, the flow returns to the step S12.

At the step S24, it judges whether or not the data was received at previous time. If the data was received, the flow goes to a step S28, while if it the data is not received, the flow returns to the step S12.

At the step S25, it judges whether or not the data was received at previous time. If the data was received, the flow goes to a step S29, while if it the data is not received, the flow returns to the step S12.

At the step S26, it calculates a difference between the previous receipt time and a current receipt time to estimate the next receipt time, and then the flow goes to a step S30. This estimate on A (the rear right wheel) is expressed by an estimate A.

At the step S27, it calculates a difference between the previous receipt time and the current receipt time to estimate the next receipt time, and then the flow goes to a step S30. This estimate on B (the rear left wheel) is expressed by an estimate B.

At the step S28, it calculates a difference between the previous receipt time and the current receipt time to estimate the next receipt time, and then the flow goes to a step S30. This estimate on C (the front right wheel) is expressed by an estimate C.

At the step S29, it calculates a difference between the previous receipt time and the current receipt time to estimate the next receipt time, and then the flow goes to a step S30. This estimate on D (the front left wheel) is expressed by an estimate D. Herein, the steps S11 to S29 correspond to a signal collision estimating means of the present invention.

At the step S30, the data is sorted in order of the receipt time, and the flow goes to a step S31.

At the step S31, the receipt time estimates are compared to each other between the rear wheel estimate (the estimate A or B) and the front wheel estimate (the estimate C or D).

At a step S32, it judges whether or not the difference between the receipt time estimate of the front wheel and the receipt time estimate of the rear wheel is within a predetermined time. If it is within the predetermined time, the flow goes to a step S33, while it exceeds the predetermined time, the flow returns to the step S12. Herein, the flow in FIG. 6 and the flow in FIG. 7 are connected with each other through a symbol of an encircled A, so that the step S32 goes to the step 33.

At the step S33, it judges whether or not the data on the rear wheel was previously received. If it was received before the current data, the flow goes to a step S34, while if it was not received before the current data, the flow goes to a step S35.

At the step S34, the antenna shifting part 13 shifts to the external antenna 17 as an antenna to be used, in advance of a predetermined time after the receipt time estimate of the rear wheel, and then the flow goes to a step S36.

At the step S35, the antenna shifting part 13 shifts to the external antenna 17 after receiving the data on the front wheel, and then the flow goes to a step S38.

At the step S36, it judges whether or not the data on the rear wheel is received. If it is received, the flow goes to a step S40, while if it is not received, the flow goes to a step S37.

At the step S37, it judges whether or not a timer counter counts a predetermined time. If counted time reaches the predetermined time, the flow goes to a step S40, while if it does not reach, the flow returns to the step S36.

At the step S38, it judges whether or not the data on the rear wheel is received. If it is received, the flow goes to a step S41, while if it is not received, the flow goes to a step S39.

At the step S39, it judges whether or not the timer counter counts the predetermined time. If its counted time reaches the predetermined time, the flow goes to a step S41, while if it does not reach, the flow returns to the step S38.

At the step S40, the antenna shifting part 13 shifts to the built-in antenna 16 as the antenna to be used, and then the flow goes to the step S12. Herein, the flow in FIG. 6 and the flow in FIG. 7 are connected with each other through a symbol of an encircled B, so that the step S40 goes to the step 12.

At the step S41, the antenna shifting part 13 shifts to the built-in antenna 16 as the antenna to be used, and then the flow goes to the step S12. Further, the steps S30 to S39, or at least the necessary steps S30 to the S35, correspond to a shift control means of the present invention.

<The Operation for Shifting the Antennas, with Estimating Collision of Data>

When the tire pressure monitoring device of the first embodiment correlates judgment results of the sensor units 2 of the front left wheel D, the front right wheel C, the rear left wheel B and the rear right wheel A with the ID (corresponding to the step S2), it receives the data signals via the built-in antenna 16 (corresponding to the steps S3 and S11).

In a case where it receives the data signals from the sensor units 2, it takes in the receipt time for each ID which is assigned to each sensor unit 2 (corresponding to the steps S18 to S21). Then, it determines a transmission interval based on the difference between the previous time and the current time to estimate the next data receipt time (corresponding to the steps S26 to S29).

Then, if the data comes from the sensor units 2a and 2b of the front wheels, the device compares the data to the next receipt time setimate of the sensor units 2c and 2d of the rear wheels (corresponding to the steps S30 and S31). On the other hand, if the data comes from the sensor units 2c and 2d of the rear wheels, the device compares the data with the next receipt time estimate of the sensor units 2a and 2b of the front wheels (corresponding to the steps S30 and S31).

When the next receipt time estimates of the sensor units 2a and 2b of the front wheels and of the sensor units 2c and 2d of the rear wheels are approximately the same, that is, when it is judged in the step S32 that their difference is within the predetermined time, for example within one second, the antenna to be used is shifted (corresponding to the steps S34 and S35).

If the front wheel data is estimated to be previously received, the antenna to be used is shifted from the built-in antenna 16 to the external antenna 17 after the current front wheel data is received (corresponding to the steps S33 and S35).

On the other hand, if the rear wheel data is estimated to be previously received, the antenna to be used is shifted from the built-in antenna 16 to the external antenna 17 after the current front wheel data is received (corresponding to the steps S33 and S35).

In addition, allowing for a case where the rear wheel data cannot be received, the antenna to be used is automatically shifted to the built-in antenna 16 after a predetermined time, for example three seconds, (corresponding to the steps S37 and S39) has elapsed since the antenna is shifed to the external antenna 17.

Nevertheless, in a case where two frames of the rear wheel data can be received before receiving twelve frames of the front wheel data via the built-in antenna 16, the antenna to be used is not shifted.

However, in a case where two frames of the front wheel data are received but the rear wheel data cannot be received, the antenna to be used is shifted to the external antenna 17 for easily receiving the rear wheel data. This enables the device to receive more frames. Therefore, it is possible to decrease the number of the frames per one transmission made by the sensor units 2. In the sensor units 2, it is possible to provide the battery with a longer operational life, due to reduction in its consumption current and also due to downsize a module thereof due to downsizing of the battery.

Further, referring to FIG. 8 to FIG. 11, the above operation and effects of the tire pressure monitoring device of the first embodiment will be described with a focus on states of the received signals.

Figure 8:
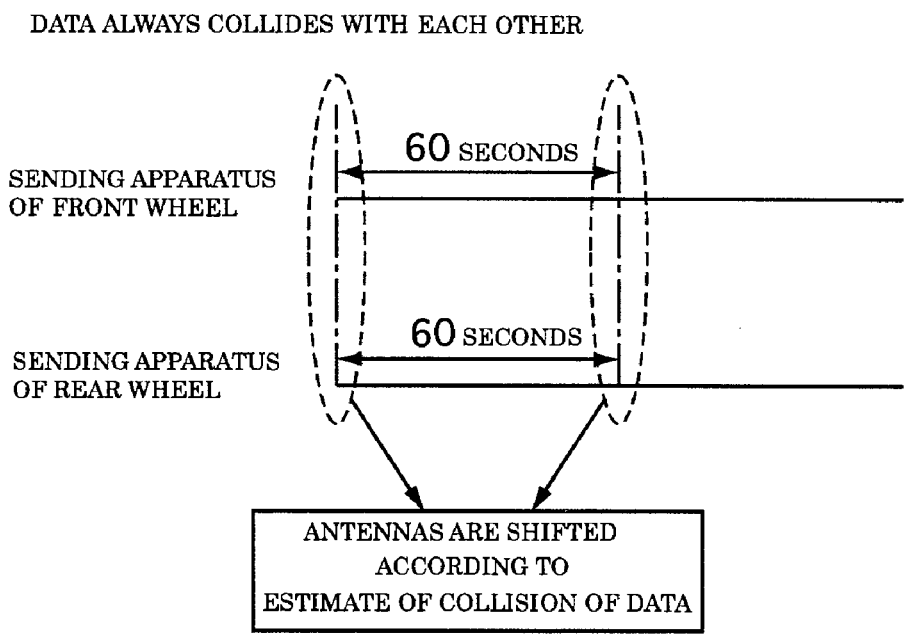
FIG. 8 is a diagram explaining a state where a data signal, outputted from the sensor unit provided on a front wheel, and a data signal, outputted from the sensor unit provided a rear wheel, always collide with each other in the tire pressure monitoring device of the first embodiment.
Figure 9:
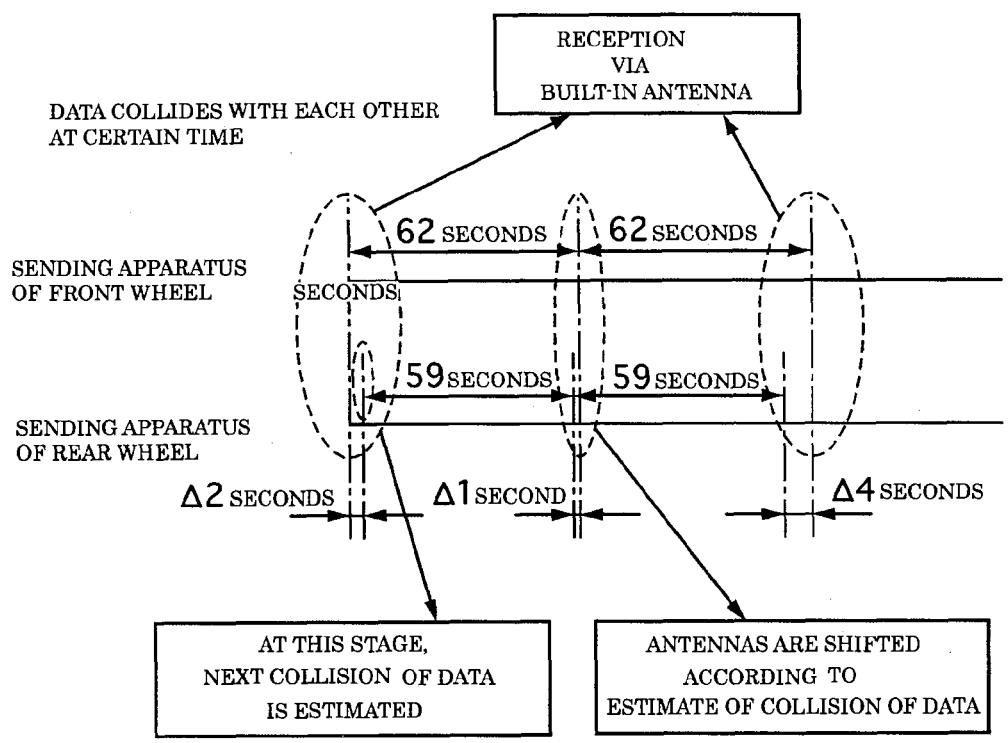
FIG. 9 is a diagram explaining a state where the data signal, outputted from the sensor unit provided on the front wheel, and the data signal, outputted from the sensor unit provided the rear wheel, collide with each other only at certain time in the tire pressure monitoring device of the first embodiment.
Figure 10:
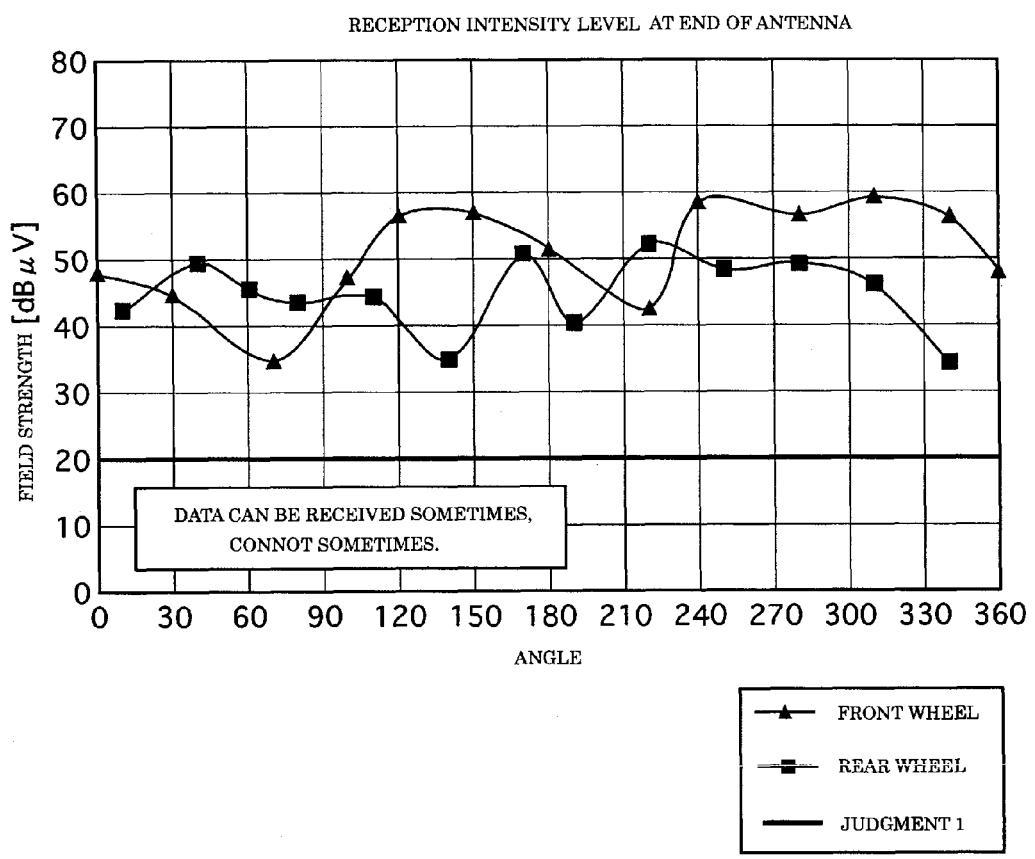
FIG. 10 is a graph showing results of a measurement of receiving sensitivity in a case where a built-in antenna receives the signals outputted from the sensor units of the front and rear wheels in the tire pressure monitoring device of the first embodiment.
Figure 11:
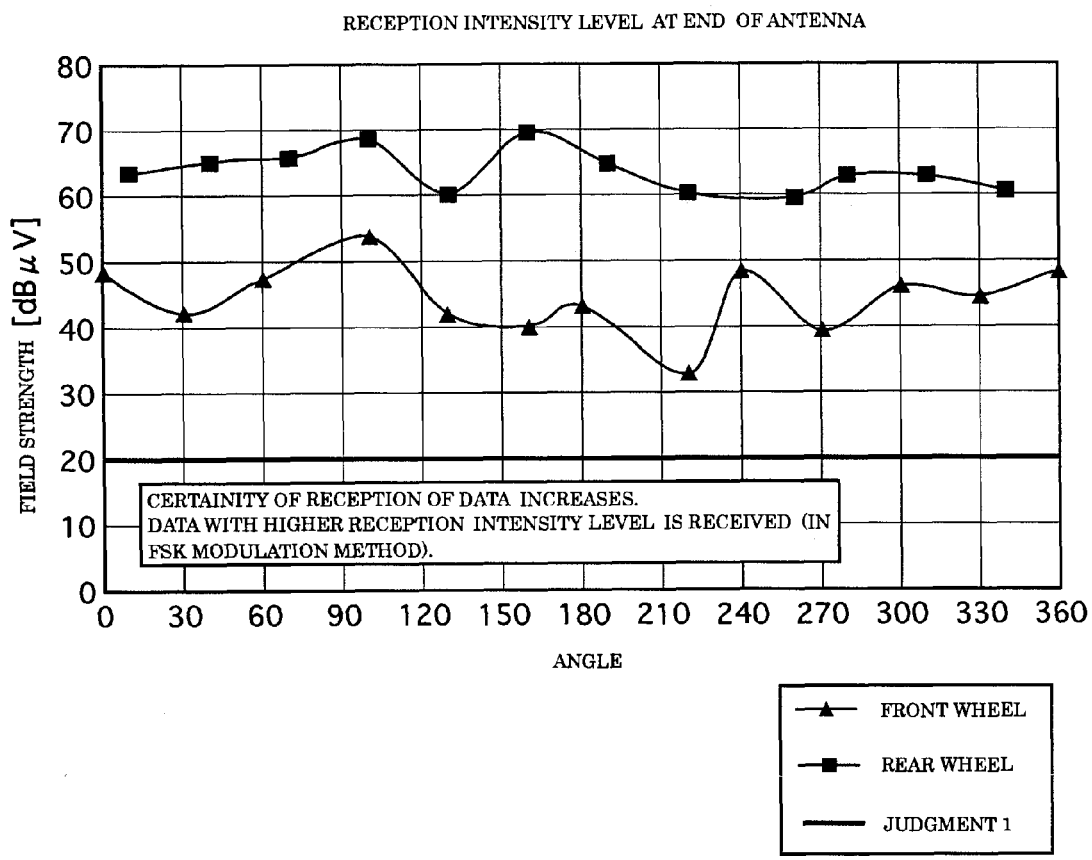
FIG. 11 is a graph showing results of a measurement of the receiving sensitivity in a case where an external antenna receives the signals outputted from the sensor units of the front and rear wheels in the tire pressure monitoring device of the first embodiment.

FIG. 8 is a diagram explaining a state where the data signals outputted from the sensor units of the front wheels and the rear wheels always collide with each other. FIG. 9 is diagram explaining a state where the data signals outputted from the sensor units of the front wheels and the rear wheels collide with each other only at certain time. FIG. 10 is a graph showing a measurement result of a reception intensity level in a case where the built-in antenna receives the data signal outputted from the sensor units of the front wheels and the rear wheels in the tire monitoring device of the first embodiment. FIG. 11 is a graph showing a measurement result of the reception intensity level in a case where the external antenna receives the data signal outputted from the sensor units of the front wheels and the rear wheels in the tire monitoring device of the first embodiment.

The tire pressure monitoring device of the first embodiment receives the data signals from the sensor units 2 of the four front and rear wheels via the built-in antenna 16 which is incorporated into the receiving apparatus 1 located at the relatively front side of the motor vehicle to monitor the tire pressures and warn a driver so as to set off checkup thereof as needed.

Therefore, although the distances between the sensor units 2 and the built-in antenna 16 of the receiving apparatus 1 are different from one another, the output levels from the sensor units 2 are adjusted, so that it can evenly receive the data signals at a satisfactory reception intensity level, as shown in FIG. 10.

In this state, when the antenna to be used is shifted to the external antenna 17, a relatively large difference is produced between the reception intensity levels of the sensor units of the front wheels and those of the rear wheels, which enables the receiving apparatus 1 to judge whether the data signal is received from the front wheels or the rear wheels.

However, the built-in antenna 16 evenly receives the data signals at the satisfactory reception intensity level, and consequently it cannot judge the front wheels or the rear wheels, as understood from FIG. 10.

On the other hand, the tire pressure monitoring device of the first embodiment receives the data signals from the sensor units of the rear wheels by shifting to the external antenna 17 using a modulation method, where the data signal at higher reception intensity level can be received without problems, in a case of the collision of the data signals, as under stood from FIG. 11.

In addition, the tire pressure monitoring device estimates the next collision by carrying out the processes of the steps S26 to S32. Therefore, the data signals of the rear wheels can be received by shifting the antennas in the case where the data signals always collide with each other as shown in FIG. 8, and also in the case where the data signals collide with each other at the certain time as shown in FIG. 9. In FIG. 9, initial data signals are received at an interval of two seconds, so that the both signals can be received via the built-in antenna 16. Based on the comparison between the previous data signal (the initial data signal) and the current data signal, it is judged to occur a collision within one second in the next reception at an initial reception stage in FIG. 9, and accordingly the antenna shifting process is executed. After that, the antenna to be used is shifted to the built-in antenna 6.

Thus, the data signals, even though they are outputted only from the sensor units of the rear wheels, can be received in the case of collision, and accordingly increasing transmission frames of the front-wheel data frame by just that much can improve its certainty of the receptions, thereby improving its reliability of the system.

In a case where the system has a little need to increase the transmission frames, the total number of the transmissions can be decreased. Therefore, the sensor units 2 can be saved from exhausting electric power, thereby being provided with a longer operational life. In addition, it enables the battery, which takes up many space of the sensor units 2, to be downsized, thereby also downsizing of the units.

In addition, obtaining the data, even though it is outputted only from the sensor units of the rear wheels in the case of collision, can provide the device with the following operation and effects.

In a tire pressure monitoring device without a construction of the above features of the embodiment, it judges a malfunction in a case where the data cannot be obtained for more than the certain time due to the collision of data, not due to a mechanical breakdown. In that case, check-up and/or component replacement may be made, although there is no malfunction thereof, which consequently brings a user disadvantage, such that the user cannot use his or her vehicle and have to pay a repair cost. These disadvantages can be removed in the first embodiment, since the data can be obtained based on only the sensor units of the rear wheels in the case of collision.

<Judging Operation of Front, Rear, Right and Left Wheels>

The position judging process, of the sensor units 2 of the front, rear, right and left wheels, which is executed at the step S2 in FIG. 6 will be described.

The rotation sensors 23 are used as the sensor units 2, and the transmission data contains the information on rotational directions of the tires. The CPU part 11 of the receiving apparatus 1 judges the right tire and the left tire by executing a process of the step S4. The rotational directions are set to be opposite to each other between the right tires and the left tires, and therefore it becomes easier to judge the right tire and the left tire.

Further, in a normal usage, the outputs level of the RF parts 25 of the sensor units 2 are adjusted so that the built-in antenna 16 can receive the data signals at the even reception intensity levels, and the external antenna 17 is near the sensor units 2 of the rear wheels, so that it receives the data signals from the sensor units 2 of the rear wheels at higher reception intensity levels. Since the external antenna 17 is far from the sensor units 2 of the front wheels outputs their data signals at lower output levels, it receives the data signals therefrom at lower reception intensity levels. By using this fact, the sensor units 2 are judged to be at the positions of the front wheel sides or the rear wheel side.

<Reduction In Manufacturing Costs>

In the tire pressure monitoring device of the first embodiment, it is preferable to use an antenna of a keyless entry system so as to function as at least the external antenna 17.

This enables the device to judge the positions of the sensor units 2 of the front wheels and the rear wheels and also to receive the data signals in a case of the collision of the data signals, by shifting between the built-in antenna 16 and the external antenna 17 without increasing its manufacturing costs.

Next, the effects of the tire position detecting device of the first embodiment will be described.

The tire position detecting device of the first embodiment can obtain the effects listed below. (1) The receiving apparatus 1 is installed on the motor vehicle to receive the data signals of the tire pressures wirelessly sent from the sensor units 2 (2a to 2d) provided on the respective tires 3 (3a to 3d) of the motor vehicle at the substantially same output levels. The receiving apparatus includes the built-in antenna 16, the external antenna 17 located apart from the built-in antenna 16 in the longitudinal direction of the motor vehicle, the antenna shifting part 13 for shifting the receiving antennas 16 and 17, and the CPU part 11 that detects the received signal levels outputted from the sensor units 2 to judge, based on the received signal level, whether a tire provided with the sensor unit 2 is the front wheel or the rear wheel and to estimate whether or not the data signal outputted from the sensor unit 2a of the front wheel, 2b collide with the data signal outputted from the sensor unit 2c, 2d of the rear wheel, thereby executing a process for actuating the antenna shifting part 13 so that the received signal levels have a difference, in case where it is estimated that the data signal from the sensor unit of the front wheel and the data signal from the sensor unit of the rear wheel collide with each other.

Therefore, the receiving apparatus 1 can more surely receive the data signal to decrease the lack of the data to be received, thereby increasing its reliability.

(2) In the receiving apparatus 1, the built-in antenna 16 and the external antenna 17 receives the data signals at the positions where the received levels from the sensor units provided with the respective tires are different from each other between the front wheel side and the rear wheels, and the antenna shifting part 13 controlled by the CPU part 11 shifts the receiving antennas which receives the data signals at the positions where the received levels from the sensor units provided with the respective tires are different from each other between the front wheel side and the rear wheels, in the case where the collision of the data is estimated.

(3) The sensor units 2 send the right-wheel information and the left-wheel information which are different from each other, and the receiving apparatus 1 judges whether the data signal is received from the right wheel or the left wheel based on the right-wheel information and the left-wheel information both outputted from the sensor units 2. This enables the receiving apparatus 1 to more surely receive the data signals to decrease the lack of the data to be received, thereby increasing its reliability, and monitoring the pressures of the respective tires.

While the tire pressure monitoring device of the first embodiment has been described above, its concrete constructions are not limited to this embodiment, and modifications and design changes are included in the scope of the present invention as long as they depart from the subject matters of the present invention.

For example, the receiving apparatus 1 may be located at a rear side of the motor vehicle instead of the front side thereof. In that case, it is preferable that an antenna is installed at the rear side and uses an antenna of other on-vehicle devices, thereby decreasing its manufacturing costs.

In addition, judgment of the left wheel or the right wheel may be made by using other sensors except the rotation sensors.

Further, in a case where an antenna of a keyless entry system is used to function as the receiving antenna of the device, the receiving antennas may be shifted to the antenna of the system so that it can well receive a signal from an electric key when it has a high possibility of receiving the signal from the electric key (such when a request button provided on a trunk is pressed).

INDUSTRIAL APPLICABILITY

The tire pressure monitoring device of the present invention is easily adaptable to a moving object. In addition, it is easily adaptable to other devices and the like of motor vehicles.

The invention claimed is:

1. A tire pressure monitoring device comprising:
sensor units provided on respective wheels of a motor vehicle; and
a receiving apparatus provided on a vehicle body of the motor vehicle and configured to receive data signals of tire pressures wirelessly sent at substantially the same output levels from the sensor units, wherein
the receiving apparatus includes:
at least two receiving antennas located apart from each other in a longitudinal direction of the motor vehicle;
an antenna shifting means for shifting the at least two receiving antennas;
a reception intensity level detecting means for detecting reception intensity levels of received data signals outputted from the sensor units;
a front-wheel/rear wheel judging means for judging, based on the reception intensity levels, whether the wheel, provided with the sensor unit from which the data signal is received, is a front wheel or a rear wheel;
a signal collision estimating means for estimating whether the data signal from the sensor unit of the front wheel and the data signal from the sensor unit of the rear wheel collide with each other; and a shifting control means for actuating the antenna shifting means so that the reception intensity levels depart from each other when the data signal from the sensor unit of the front wheel and the data signal from the sensor unit of the rear wheel are estimated to collide with each other.

2. The tire pressure monitoring device according to claim 1, wherein the at least two receiving antennas are located at positions where reception intensity levels from the sensor units provided with the tires are different from each other between the front wheels and the rear wheels, and wherein the shifting control means shifts to the receiving antenna which receives at the positions where the reception intensity levels are different between the front wheels and the rear wheels when the data signals are estimated to collide with each other.

3. The tire pressure monitoring device according to claim 1, wherein the sensor units of the right wheels and the left wheels send right-wheel information and left-wheel information, respectively, the right-wheel information and the left-wheel information being different from each other, and wherein the receiving apparatus further includes a right-wheel/left-wheel judging means for judging the right wheel or the left wheel based on the right-wheel information and the left-wheel information.

4. The tire pressure monitoring device according to claim 1, wherein the signal collision estimating means calculates a difference of each wheel between a previous receipt time and a current receipt time to calculate an estimated receipt time based on the difference.

5. The tire pressure monitoring device according to claim 4, wherein the shift control means sorts receipt time obtained from the signal collision estimating means in order of receipt of the receipt time to judge whether a difference between the estimated receipt time of the rear wheel and the estimated receipt time of the front wheel is within a predetermined time, the shift control means shifting the antenna to be used according to an earlier receipt of the date of the front wheels and the rear wheels if the difference is within the predetermined time.

6. The tire pressure monitoring device according to claim 2, wherein the sensor units of the right wheels and the left wheels send right-wheel information and left-wheel information, respectively, the right-wheel information and the left-wheel information being different from each other, and wherein the receiving apparatus further includes a right-wheel/left-wheel judging means for judging the right wheel or the left wheel based on the right-wheel information and the left-wheel information.

7. The tire pressure monitoring device according to claim 2, wherein the signal collision estimating means calculates a difference of each wheel between a previous receipt time and a current receipt time to calculate an estimated receipt time based on the difference.

8. The tire pressure monitoring device according to claim 3, wherein the signal collision estimating means calculates a difference of each wheel between a previous receipt time and a current receipt time to calculate an estimated receipt time based on the difference.

* * * * *